United States Patent
Biswas et al.

(10) Patent No.: US 8,667,605 B2
(45) Date of Patent: Mar. 4, 2014

(54) METHOD AND SYSTEM FOR DETERMINING THE ELIGIBILITY FOR DEPLOYING PROTECTED CONTENT

(75) Inventors: Sanjeev Kumar Biswas, Ghaziabad (IN); Mansukh Patidar, Noida (IN); Pradeep Cyril Ekka, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 987 days.

(21) Appl. No.: 12/622,031

(22) Filed: Nov. 19, 2009

(65) Prior Publication Data

US 2014/0033196 A1    Jan. 30, 2014

(51) Int. Cl.
G06F 7/04    (2006.01)

(52) U.S. Cl.
USPC ........ 726/27; 726/4; 726/26; 726/28; 726/29; 705/59; 713/182; 713/189; 713/193; 717/174; 717/175

(58) Field of Classification Search
None
See application file for complete search history.

(56) References Cited

U.S. PATENT DOCUMENTS

| | | | | |
|---|---|---|---|---|
| 6,223,291 B1 * | 4/2001 | Puhl et al. | | 726/28 |
| 6,823,075 B2 * | 11/2004 | Perry | | 382/100 |
| 6,920,565 B2 * | 7/2005 | Isaacson et al. | | 713/193 |
| 6,920,567 B1 * | 7/2005 | Doherty et al. | | 726/22 |
| 6,959,291 B1 * | 10/2005 | Armstrong et al. | | 705/59 |
| 7,313,828 B2 * | 12/2007 | Holopainen | | 726/29 |
| 7,398,524 B2 * | 7/2008 | Shapiro | | 717/175 |
| 7,478,385 B2 * | 1/2009 | Sierer et al. | | 717/174 |
| 7,707,116 B2 * | 4/2010 | Walker et al. | | 705/59 |
| 7,765,600 B2 * | 7/2010 | Saunders et al. | | 726/27 |
| 7,818,262 B2 * | 10/2010 | Kavuri et al. | | 705/59 |
| 7,831,517 B1 * | 11/2010 | Vijay et al. | | 705/59 |
| 7,908,662 B2 * | 3/2011 | Richardson | | 726/26 |
| 8,175,977 B2 * | 5/2012 | Story et al. | | 705/59 |
| 2002/0007351 A1 * | 1/2002 | Hillegass et al. | | 705/59 |
| 2002/0010681 A1 * | 1/2002 | Hillegass et al. | | 705/59 |
| 2002/0012445 A1 * | 1/2002 | Perry | | 382/100 |
| 2002/0065781 A1 * | 5/2002 | Hillegass et al. | | 705/59 |
| 2002/0077988 A1 * | 6/2002 | Sasaki et al. | | 705/59 |
| 2003/0088516 A1 * | 5/2003 | Remer et al. | | 705/59 |
| 2003/0177073 A1 * | 9/2003 | Ogai | | 705/26 |
| 2004/0044629 A1 * | 3/2004 | Rhodes et al. | | 705/59 |
| 2004/0054923 A1 * | 3/2004 | Seago et al. | | 713/201 |
| 2004/0153649 A1 * | 8/2004 | Rhoads et al. | | 713/176 |
| 2005/0080846 A1 * | 4/2005 | McCleskey et al. | | 709/202 |
| 2005/0114672 A1 * | 5/2005 | Duncan et al. | | 713/182 |
| 2005/0251488 A1 * | 11/2005 | Saunders et al. | | 705/59 |
| 2005/0289072 A1 * | 12/2005 | Sabharwal | | 705/59 |
| 2006/0190409 A1 * | 8/2006 | Hillegass et al. | | 705/59 |
| 2007/0143228 A1 * | 6/2007 | Jorden et al. | | 705/71 |
| 2007/0198421 A1 * | 8/2007 | Muller et al. | | 705/52 |
| 2007/0198422 A1 * | 8/2007 | Prahlad et al. | | 705/52 |

(Continued)

Primary Examiner — Steven Snyder
(74) Attorney, Agent, or Firm — Schwegman Lundberg & Woesser, P.A.

(57) ABSTRACT

Methods and systems for using a flexible serialization technique to determine whether certain protected content items (e.g., software) are eligible to be installed on a target computer system during an installation procedure are described. Consistent with some embodiments of the invention, a serial number entered by an end-user is decoded to identify a product identifier that corresponds with a select folder in a folder hierarchy on a storage medium that contains various payloads for installing digital content items on a target computer system. The folder that corresponds with the product identifier includes license configuration information that specifies a set of digital content items eligible for installation, based on the serial number entered by the end-user.

15 Claims, 6 Drawing Sheets

(56) References Cited

U.S. PATENT DOCUMENTS

| | | | |
|---|---|---|---|
| 2007/0256144 A1* | 11/2007 | Hoffman et al. | 726/28 |
| 2008/0004886 A1* | 1/2008 | Hames et al. | 705/1 |
| 2008/0005033 A1* | 1/2008 | Clark et al. | 705/59 |
| 2009/0164801 A1* | 6/2009 | Kawahara | 713/189 |
| 2012/0278606 A1* | 11/2012 | Huang | 713/2 |

\* cited by examiner

METHOD AND SYSTEM FOR DETERMINING THE ELIGIBILITY FOR DEPLOYING PROTECTED CONTENT

TECHNICAL FIELD

The present disclosure generally relates to mechanisms for installing software applications on target computer systems. More specifically, the present disclosure relates to methods and systems for determining whether certain protected content items (e.g., software) are eligible to be installed on a target computer system, during an installation procedure.

BACKGROUND

When installing a software application, or a suite of software applications, a software installation process is generally executed to perform the actual transfer of computer files from a computer-readable medium (e.g., a compact disc (CD) or a digital video disc (DVD), flash memory, or similar) to a fixed disk or hard drive of the target computer system. Even when software is downloaded over a network, and then installed directly from a fixed disk or hard drive, the installation of the software application(s) will typically result in the transfer of certain files from one location to another, and/or the manipulation of certain operating system settings (e.g., registry settings), before the software applications are considered to be installed and are fully executable. In some instances, certain software applications may be distributed, either individually or as a suite of applications, along with protected content (e.g., other software applications, or digital content). For example, a software vendor may distribute a video editing software application along with one or more codecs (coder-decoders) from one or more third parties. In such a scenario, the third-party provided codecs may be considered protected content, such that the installation of the protected content on to the target computer system will result in the software vendor paying the third party a royalty or license fee. Accordingly, installation of protected content typically requires that license information (e.g., a serial number) be provided by the end-user.

For example, in FIG. 1, a computer-readable storage medium 10 is shown storing three point products (e.g., software applications 1, 2 and 3), and two items of protected content (e.g., protected content 1 and protected content 2). In this example, the protected content items may represent third-party codecs, plug-ins, or other add-on components that operate in conjunction with the software applications. In any case, during the installation of the software applications, an installer application 12 is executed at the target computer 14. The installer 12, prior to transferring any protected content to the fixed disk of the computer system 14, will prompt the end-user to provide license information, such as a serial number. With conventional software installation procedures, the installation of all protected content on a particular computer-readable storage medium is subject to the validation of the same serial number. Accordingly, if the serial number entered by the end-user is determined to be valid, all protected content on the computer readable storage medium 10 is automatically installed on the target computer system. Consequently, software vendors are required to bundle and distribute applications and protected content in a variety of different configurations in order to protect certain content from unauthorized installation and use.

DESCRIPTION OF THE DRAWINGS

Some embodiments are illustrated by way of example and not limitation in the Figures of the accompanying drawings, in which.

DETAILED DESCRIPTION

Figure 1:
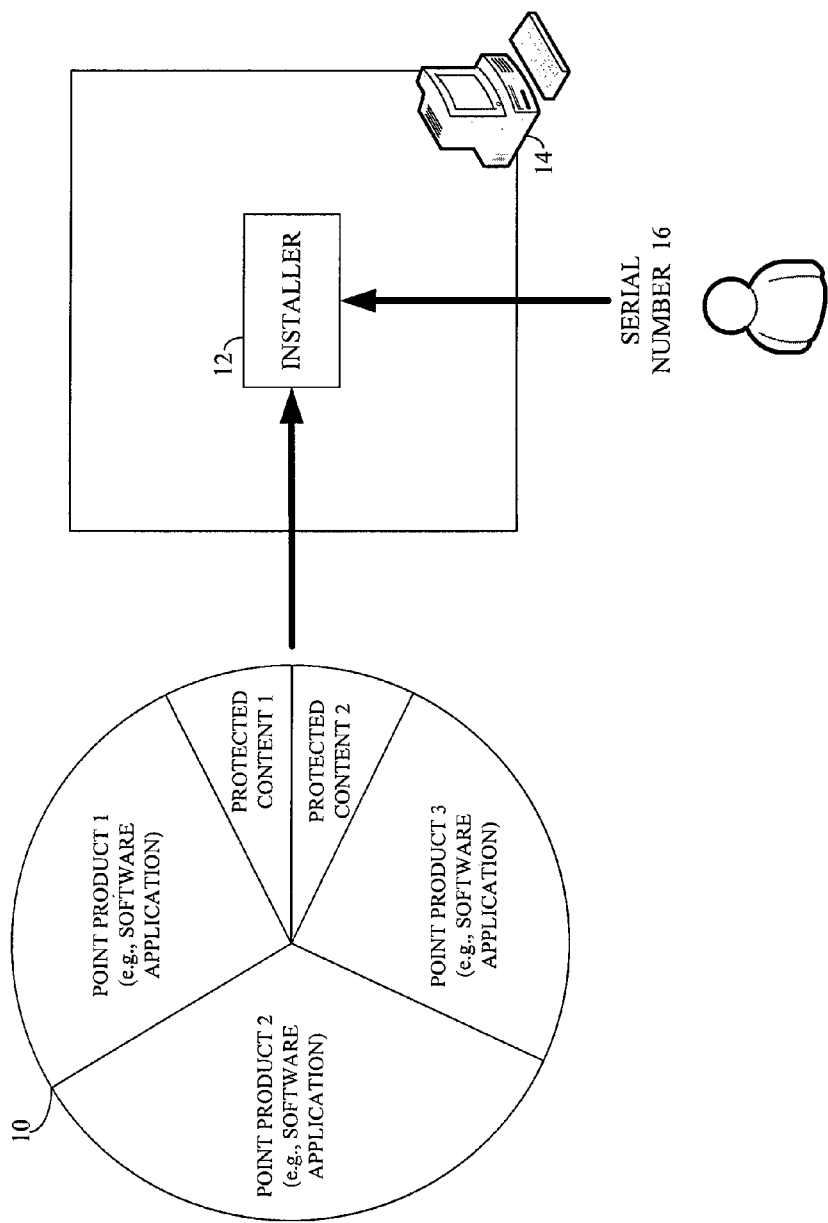
FIG. 1 illustrates a functional block diagram of a conventional software installation mechanism for which the installation of all protected content on a single computer-readable storage medium is subject to a single serial number.

Methods and systems for using a flexible serialization scheme to establish whether certain digital content items (e.g., software applications and/or add-on components) are eligible for installation on a target computer system are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

As used herein, the term "digital content item" refers to any digital content, such as an independently executable software applications (e.g., launchable entities), or add-on components, such as a plug-ins, add-ins, snap-ins, or other software modules that are dependent upon another software application to operate. In general, installing a digital content item on a computer system involves processing one or more payloads stored on a distributable computer-readable storage medium. As used herein, a payload is a file or set of files and a corresponding set of detailed instructions for installing a particular application, add-on component, or discrete piece of functionality, using the file(s). These instructions may include directions on where to copy the content of an install archive to the target computer system, how to name each item (e.g., folder or file) that is copied, what operating system configuration is needed, or directions for necessary provisioning activities. A payload may also contain additional material used by the installer program when following the payload instructions, such as an install archive, graphics for display in the installer program's user interface, or metadata about related payloads. A payload can take many forms; it can be a single file, a group of files, a folder, or a folder hierarchy. Typically, a given install program understands only certain payload forms.

Consistent with embodiments of the invention, installing a digital content item involves a process of transferring product files and related files from one storage medium (e.g., a CD or DVD) to a computer system's storage medium (e.g., a fixed disk or hard drive), and performing any necessary operating system configuration, so that when the installation is complete, the product or products can be executed in the correct way. While the examples provided herein involve the use of a distributable storage medium (e.g., a CD or DVD), it will be appreciated by those skilled in the art that the inventive concept is not limited to such distributable storage medium. In particular, methods and systems described herein may be used to establish whether digital content items on a fixed disk, hard drive, or other non-distributable storage medium are eligible for installation to a target computer system, for example, over a computer network. In any case, an install can be a very simple process, involving the transfer of only a few files and a few configuration settings done by one install process. Alternatively, an installation may be complex, involving many files comprising numerous components that work together as one application or set of applications, and may require multiple install processes to install and conFigure completely.

Consistent with some embodiments of the invention, a flexible serialization technique is used to establish whether digital content items on a storage medium are eligible for installation on a computer system. For instance, a serial number entered by an end-user dictates which digital content items are eligible for installation. In some embodiments, the end-user provided serial number is decoded to generate a product identifier (ID). The product ID is used to identify a folder stored on the storage medium that contains license configuration information, indicating which digital content items are eligible for installation on the target computer system. The folder may be referred to as a license configuration folder and may be indexed, for example, by a product ID. Accordingly, a product ID derived from decoding an end-user provided serial number can be used to identify the particular license configuration folder that contains the license configuration information for that particular serial number (and product identifier). In some embodiments, the license configuration information may be embodied in a file (e.g., an eXtensible markup language (XML) file) that identifies the particular digital content items that are eligible for installation on a target computer system, based on the serial number that was entered by an end-user. By using a flexible serialization technique, control can be maintained over what digital content items are installable by an end-user, without consideration for what particular digital content items are written to a particular storage medium. Other aspects of the inventive subject matter will become readily apparent from the description of the Figures that follow.

Figure 2:
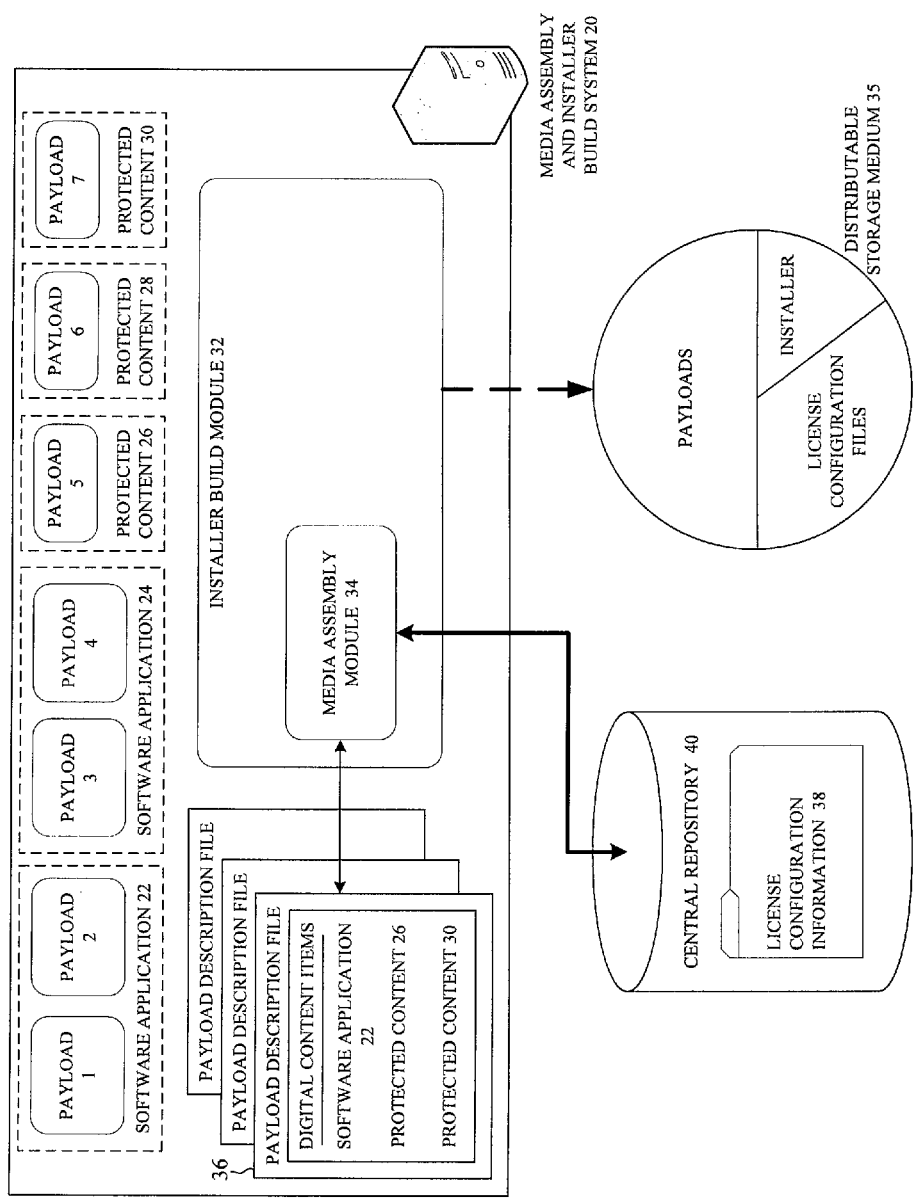
FIG. 2 illustrates a functional block diagram of the various functional modules involved in a media assembly and installer build system for generating a distributable computer-readable storage medium having one or more digital content items which are installable to a target computer system based on a flexible serialization scheme, according to an embodiment of an invention.

FIG. 2 illustrates a functional block diagram of the various functional modules involved in a media assembly and installer build system 20 for generating a distributable computer-readable storage medium 22 having one or more digital content items (including software applications and protected content items) which are installable to a target computer system based on a flexible serialization scheme, according to an embodiment of the invention. As illustrated in FIG. 2, a media assembly and installer build system 20 includes various digital content items, including software applications 22 and 24, and protected content items 26, 28 and 30. The individual digital content items may be comprised of more than one payload, as is the case with software applications 22 and 24—each of which includes two payloads (e.g., payloads 1 and 2, and payloads 3 and 4 respectively). In addition, the media assembly and installer build system 20 includes an installer build module 32 with a media assembly module 34. In general, and as described below, the media assembly and installer build module 20 are used to assemble and transfer content to a distributable storage medium. In particular, the content transferred to the distributable storage medium includes payloads, license configuration information, and an installer application. Once the media assembly and installer build system 20 has generated the proper installer, and written the installer, payloads and license configuration files to the storage medium 35, the storage medium is ready for use by an end-user to perform an installation process.

In some embodiments, the installer build module 32 is an application or process that generates an installer application (referred to herein simply as an installer) for installing one or more digital content items from a distributable storage medium 35 to a target computer system. As the installer build module 32 is processing instructions for generating the installer for a particular distributable storage medium 35, the media assembly module 34 is invoked to read a payload description file 36 that lists the digital content items that are to be included on the storage medium 35. For each digital content item to be included on the storage medium 35, the media assembly module 34 reads license configuration information 38 from a central repository 40 that contains license configuration information. For example, the license configuration information stored at the central repository may be used during the installer build process for building an installer for any software applications. The license configuration information 38 for each digital content item is then written to the storage medium 35 with the payloads for each digital content item, and the installer program. In some embodiments, the license configuration information 38 includes a license configuration folder for each digital content item. The folder is named based on a product ID, such that a product ID can be used as an index for the selection of license configuration folders, and based on a product ID, a license configuration folder can be selected with the correct license configuration information. Within each license configuration folder is a file (e.g., an eXtensible Markup Language, or XML file) that identifies the digital content items that are eligible for installation on a target computer system. Accordingly, when an end-user enters a serial number at a target computer system during the installation process, the serial number can be decoded to derive a product ID, which can be used to select the correct license configuration folder containing a file identifying the digital content items that are eligible for installation on the target computer system. In some embodiments, the list of eligible digital content items read from the file within the selected license configuration folder is compared to a list of digital content items stored on the distributable storage medium 35 to determine the actual digital content items to be installed.

Figure 3:
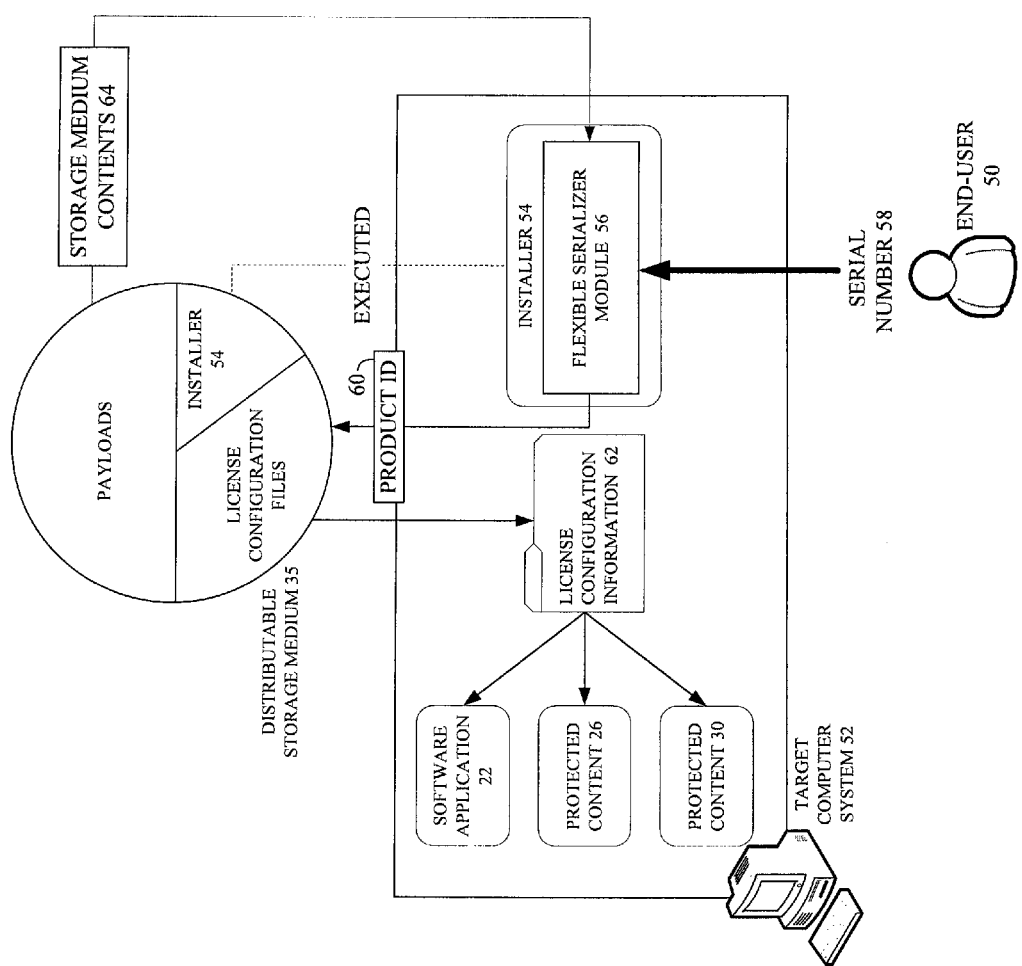
FIG. 3 illustrates a functional block diagram of the various functional modules involved in a software installation mechanism for which the installation of various digital content items is subject to a flexible serialization mechanism, according to an embodiment of the invention.

FIG. 3 illustrates a functional block diagram of the various functional modules involved in a software installation process for which the installation of various digital content items is subject to a flexible serialization mechanism, according to an embodiment of the invention. As illustrated in FIG. 3, an end-user 50 is utilizing a distributable storage medium 35 to perform an installation process to install several digital content items to a target computer system 52. During the installation process, an installer application 54 is executed on the target computer system 52. As illustrated in FIG. 3, the installer 52 is shown residing on the distributable storage medium 35, prior to execution, and on the target computer system 52, during execution of the installer 54. As such, in the example of FIG. 3, the installer 54 is distributed with the storage medium 35. In alternative embodiments, the installer

54 may be common to several storage media, applications or suite of applications, and will reside and execute at the target computer system 52. In such a scenario, the installer 54 may simply read non-executable installation instructions from the distributable storage medium 35.

In any case, the installer utilizes a flexible serializer module 56. The flexible serializer module 56 prompts the end-user to provide a serial number 58. When the flexible serializer module 56 receives the serial number 58 from the end-user 50, the flexible serializer module 56 decodes the serial number 58 to derive a product ID 60. The product ID 60 is used to select a license configuration folder on the storage medium 35. For example, in some embodiments, a hierarchy of license configuration folders—each named to correspond with a product ID 60—resides on the storage medium 35. Within each license configuration folder is license configuration 62 information contained in one or more files, including a file that identifies the digital content items eligible for installation on the target computer system 52. Accordingly, the digital content items eligible for installation on the target computer system 52 can be identified by decoding the serial number 58 entered by the end user 50.

In some embodiments, the set of digital content items determined to be eligible for installation is compared with a second set of digital content items known to be stored on the storage medium 35. For instance, during the installation process, the installer 54 will identify all of the storage medium contents 64—for example, including a list or set of the digital content items stored on the storage medium 35. In some embodiments, the set of digital content items eligible for installation is compared with the set of digital content items stored on the storage medium 35 to determine the subset of digital content items that are actually selected to be installed on the target computer system 52. For example, the intersection of the set of digital content items eligible for installation and the set of digital content items on the storage medium 35 represents the set of digital content items to be installed. In this example, software application 22, protected content item 26 and protected content item 30 are selected for installation on the target computer system 52. In this case, those digital content items correspond with the payload description file 36 used to generate the storage medium 35.

Figure 4:
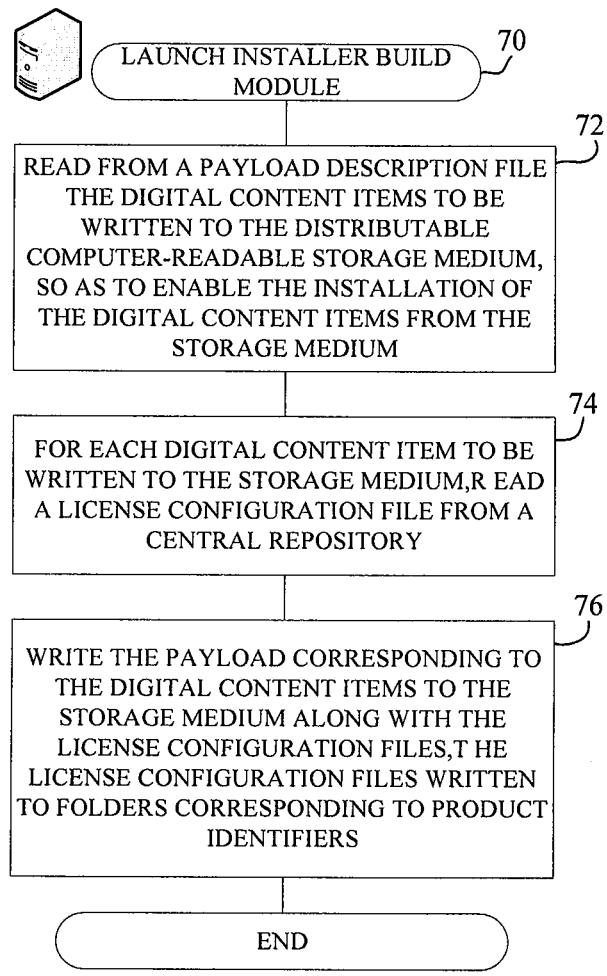
FIG. 4 illustrates a method for generating a distributable computer-readable storage medium having one or more digital content items which are installable based on a flexible serialization scheme, according to an embodiment of an invention.

FIG. 4 illustrates a method for generating a distributable computer-readable storage medium having one or more protected content items which are installable based on a flexible serialization scheme, according to an embodiment of an invention. The method begins at method operation 70 when the installer build module is first launched. Next, at method operation 72, a payload description file 36 is read to identify the digital content items that are to be written to the distributable computer readable storage medium. For example, the payload description file lists all of the digital content items that are to be included on the storage medium, and thus, can be installed from the storage medium. At method operation 74, for each digital content item that is to be written to the storage medium, a license configuration file is read from a central repository. The license configuration file may be within a folder that is named after a product identifier. Finally, at method operation 76, the payloads that correspond to the digital content items are written to the storage medium along with the license configuration files that correspond to each digital content item, and the installer application for installing the digital content items to the target computer system.

Figure 5:
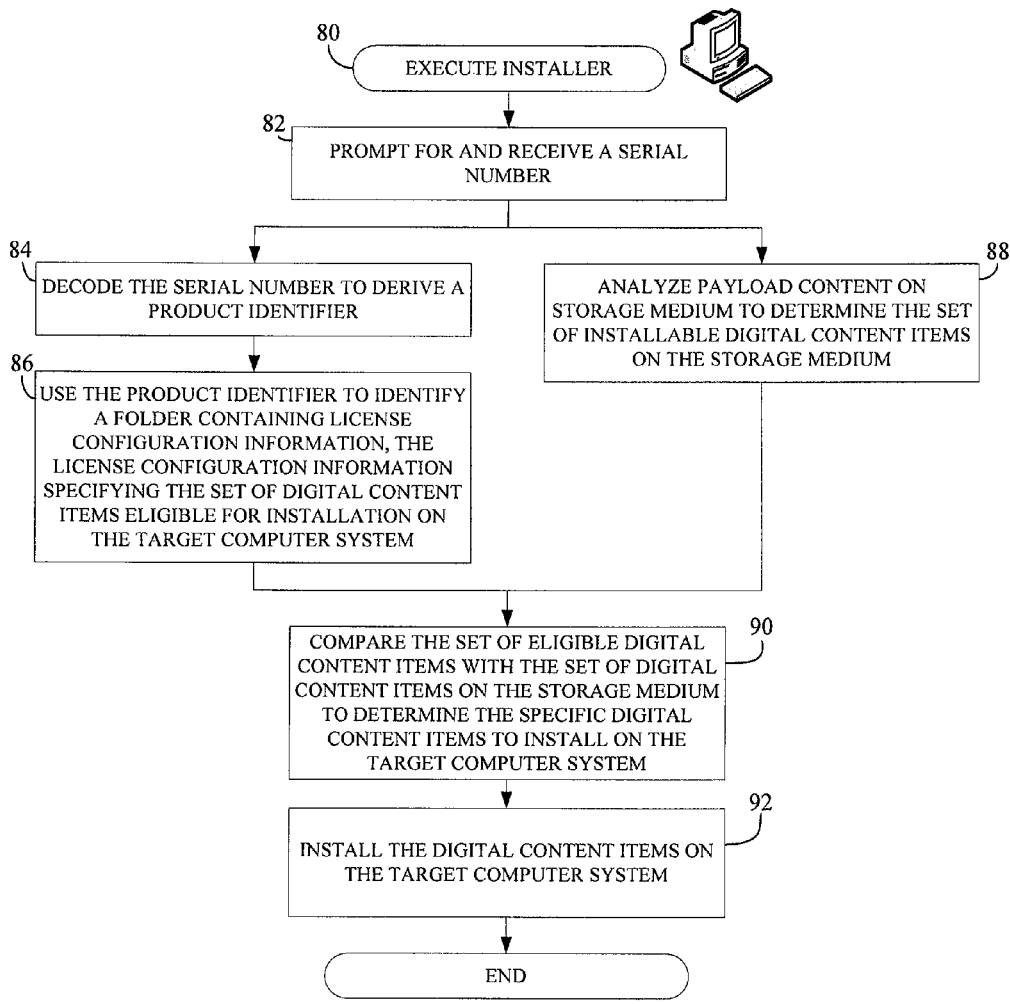
FIG. 5 illustrates a method for installing one or more digital content items from a computer-readable storage medium to a target computer system, where the installable digital content items are subject to a flexible serialization scheme, according to an embodiment of the invention.

FIG. 5 illustrates a method for installing one or more digital content items from a computer-readable storage medium to a target computer system, where the installable protected content items are subject to a flexible serialization scheme, according to an embodiment of the invention. The method begins at method operation 80 when the installer is executed at the target computer system. At method operation 82 the installer prompts an end-user to provide a serial number, and in return, receives the end-user provided serial number. At method operation 84 the serial number is decoded, for example, by a flexible serialization module, to derive a product ID. At method operation 86 the product ID is used to identify a license configuration folder containing license configuration information that corresponds to the user provided serial number. The license configuration information may be included in a file (e.g., an XML file) that specifies the set of digital content items that are eligible for installation at the target computer system.

In some embodiments, at method operation 88, the payload content on the storage medium is analyzed by the installer to determine the set of digital content items stored on the storage medium. Although in FIG. 5 this operation is shown as being performed in parallel with other operations, in alternative embodiments, method operation 88 may be performed serially, with the other operations. In any case, once the set of digital content items eligible for installation has been determined, and the set of digital content items stored on the storage medium has been determined, at method operation 90 the two sets are compared to derive a subset of digital content items to be installed on the target computer system. For example, in some embodiments, the intersection of the two sets represents the subset of digital content items to be installed on the target computer system. Finally, at method operation 92, the digital content items are installed on the target computer system.

It will be appreciated by those skilled in the art that the various method operations may be modified in some manner without departing from the overall spirit and scope of the inventive subject matter. In particular, one or more method operations may be performed in an order different from what is illustrated in FIGS. 4 and 5, without departing from the scope and spirit of the inventive subject matter. Furthermore, the various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 6:
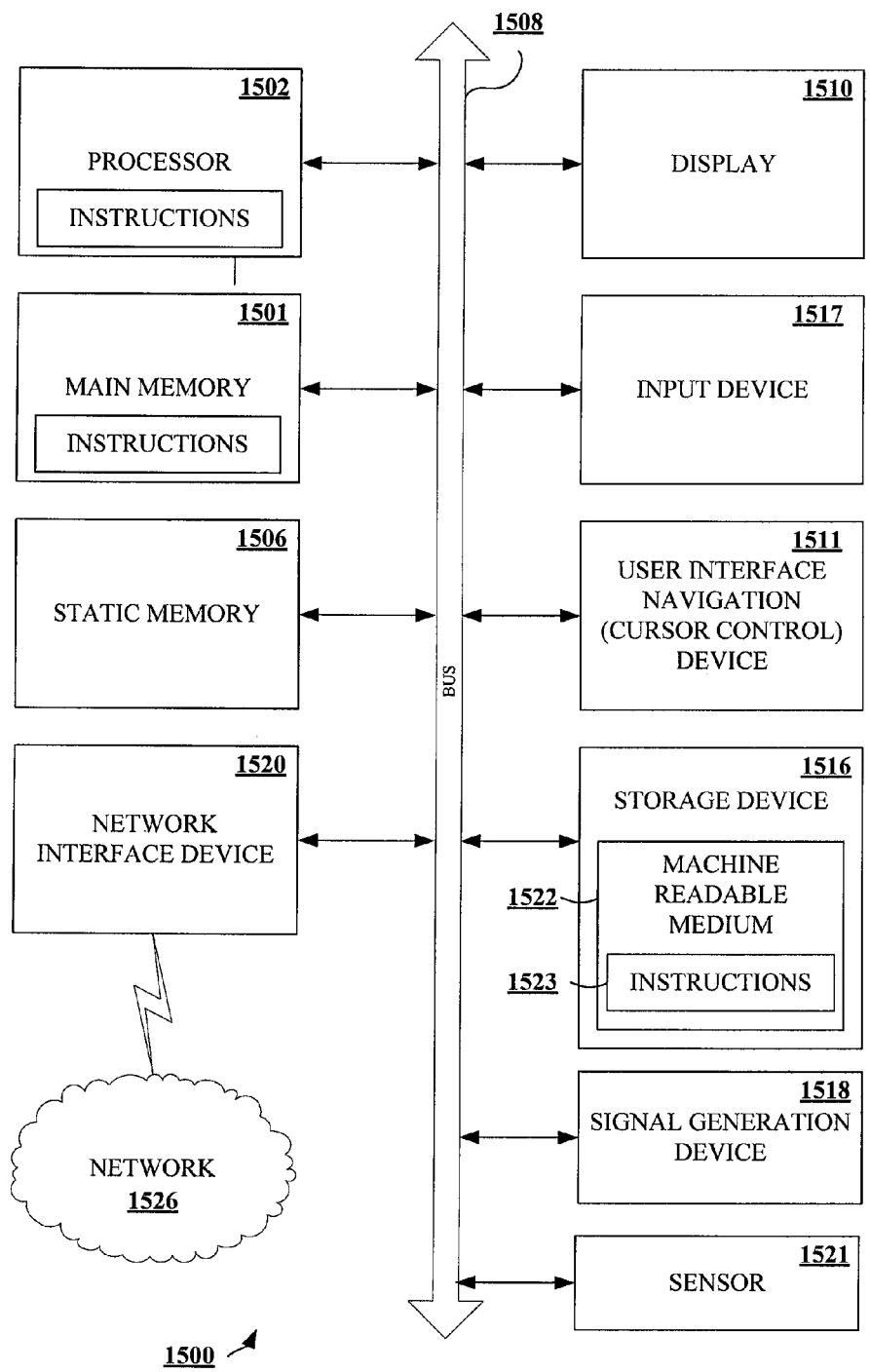
FIG. 6 is a block diagram of a machine in the form of a computer system within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A computer-implemented method comprising:
during an installation process to install one or more digital content items to a computer system, the one or more digital content items stored on a computer-readable storage medium, decoding a received serial number to identify a product identifier;
reading license configuration information from the storage medium, the license configuration information corresponding to the product identifier, the reading of the license configuration information from the storage medium includes reading a file in a folder selected based on the product identifier, the file indicating a first set of digital content items that are eligible to be installed on the computer system;
comparing the first set of digital content items that are eligible to be installed on the computer system with a second set of digital content items that are stored on the storage medium to determine a subset of digital content items to install on the computer system; and
installing the subset of digital content items on the computer system.

2. The computer-implemented method of claim 1, wherein the one or more digital content items include independently executable software applications, and add-on components for use with the independently executable software applications.

3. The computer-implemented method of claim 2, wherein the independently executable software applications are software applications that have been developed by a first software developer, and at least one add-on component has been provided by a third-party software developer.

4. The computer-implemented method of claim 1, further comprising:

analyzing one or more files of the storage medium to determine the second set of digital content items that are stored on the storage medium.

5. The computer-implemented method of claim 1, wherein the subset of digital content items to install on the computer system is represented by the intersection of the first set of digital content items and the second set of digital content items.

6. The computer-implemented method of claim 1, wherein installing the subset of digital content items on the computer system includes processing one or more payloads for each digital content item in accordance with instructions associated with the one or more payloads.

7. A non-transitory computer-readable storage medium storing instructions representing an installer, the instructions, when executed by a computer system, cause the computer system to perform a method comprising:

prompting for and receiving a serial number;

decoding the received serial number to identify a product identifier;

reading license configuration information from the computer-readable storage medium, the license configuration information corresponding to the product identifier, the reading of the license configuration information from the storage medium includes reading a file in a folder selected based on the product identifier, the file indicating a first set of digital content items that are eligible to be installed on the computer system;

comparing the first set of digital content items that are eligible to be installed on the computer system with a second set of digital content items that are stored on the storage medium to determine a subset of digital content items to install on the computer system; and processing one or more payloads corresponding with the subset of digital content items to install on the computer system in order to install the subset of digital content items on the computer system.

8. The non-transitory computer-readable medium of claim 7, wherein the one or more digital content items include independently executable software applications, and add-on components for use with the independently executable software applications.

9. The non-transitory computer-readable medium of claim 8, wherein the independently executable software applications are software applications that have been developed by a first software developer, and at least one add-on component has been provided by a third-party software developer.

10. The non-transitory computer-readable medium of claim 7, wherein the instructions cause the computer system to perform the additional method operation of:

analyzing one or more files of the storage medium to determine the second set of digital content items that are stored on the storage medium.

11. The non-transitory computer-readable medium of claim 7, wherein the subset of digital content items to install on the computer system is represented by the intersection of the first set of digital content items and the second set of digital content items.

12. The non-transitory computer-readable medium of claim 7, wherein installing the subset of digital content items on the computer system includes processing one or more payloads for each digital content item in accordance with instructions associated with the one or more payloads.

13. A computer-implemented method comprising:

during a process to generate an installer for installing one or more digital content items from a computer-readable storage medium to a target computer system, reading a payload description file indicating the one or more digital content items to be written to the computer readable storage medium;

for each digital content item to be written to the computer-readable storage medium, reading license configuration information from a central repository;

transferring the digital content items identified in the payload description file along with an executable installer and the license configuration information to the computer readable storage medium, the license configuration information including folders having folder names that correspond to product identifiers, the folders selectable with a product identifier decoded from a serial number, the license configuration information for each digital content item stored within a file located in one of the folders.

14. The computer-implemented method of claim 13, wherein the license configuration information identifies the digital content items that are eligible for installation on a computer system, based on a serial number received via the installer.

15. The computer implemented method of claim 13, wherein the installer includes a flexible serialization module for decoding a received serial number to derive a product identifier for use in selecting a folder containing license configuration information corresponding with the entered serial number, the license configuration information identifying the digital content items eligible for installation.

* * * * *